UNITED STATES PATENT OFFICE.

JOHN JACOB KESSLER, OF ST. LOUIS, MISSOURI.

VARNISH-GUM AND PRODUCING SAME.

No. 922,596.  Specification of Letters Patent.  Patented May 25, 1909.

Application filed August 3, 1908. Serial No. 446,553.

To all whom it may concern:

Be it known that I, JOHN JACOB KESSLER, a citizen of the United States, residing at St. Louis, in the State of Missouri, have invented certain new and useful Improvements in Varnish-Gum and Producing Same, of which the following is a specification.

The object of my invention is to produce a varnish which has the quality of drying rapidly and being insoluble in ordinary petroleum products, a subsidiary object of the invention being to produce a peculiar gum from which the aforesaid varnish can be produced.

In producing my improved varnish material, I take a resinous gum, such for instance as ordinary rosin, kauri, Manila gum, etc. and either pulverize it or dissolve it in a solvent on which nitric acid has little or no action. Such a solvent is found in several of the petroleum products, such for instance as naphtha. After the material has been pulverized or dissolved, as above described, I submit the same to a bath of nitric acid which may be of any desired strength although I find that the most practical and commercial results are produced with concentrated nitric acid approximating a specific gravity of 1.40. If less concentrated nitric acid is used it may be advisable to apply some heat to the material during the nitric acid action. I also find it advisable to use a slight excess of acid as any unused acid may be readily recovered and used again. Upon mixing the ingredients a reaction sometimes immediately begins if the temperature be that of an ordinary summer day. The reaction may be started either by the application of external heat or by inserting a hot iron into the mixture, whereupon a reaction will commence at the point of insertion and proceed through the whole mixture. When the reaction has been practically completed, as indicated by a fall in temperature of the reacting mass, the solid residuum is taken out and washed thoroughly in clear water until the washing water is free from nitric acid. The mass is then spread out and thoroughly dried in the sun, or in any other suitable manner. The product when dried may be dissolved in a suitable solvent such as wood or grain alcohol, much as shellac, and the resulting liquid used as a varnish which dries very quickly, thus permitting the use of sand paper in a few hours. The varnish thus made is insoluble in petroleum oils and may be varnished over with an ordinary oil varnish without softening.

In practice I have found very satisfactory results to be obtained from ordinary rosin, but there are many other resinous gums with which satisfactory results may be obtained.

I claim as my invention:—

1. A varnish resulting from the treatment of a resinous gum with nitric acid, the subsequent thorough washing and drying of the product, and the subsequent solution of such product in a suitable solvent.

2. A varnish resulting from the treatment of rosin with nitric acid, the thorough washing and drying of the product, and the subsequent solution of such product in a suitable solvent.

3. A varnish resulting from the treatment of rosin with nitric acid, the subsequent thorough washing and drying of the product, and the subsequent solution of such product in an alcohol.

4. That improvement in the art of producing varnish gums which comprises the treatment of a resinous gum with nitric acid, thoroughly washing out the acid from the product and drying said product to produce the varnish gum.

5. That improvement in the art of producing varnish gums which comprises the treatment of rosin with nitric acid, thoroughly washing out the acid from the product and drying said product to produce the varnish gum.

6. That improvement in the art of producing varnishes which comprises the solution of a resinous gum in a solvent substantially unaffected by nitric acid, subjecting such solution to the action of nitric acid, removing the excess acid from the product by washing, drying the product, and dissolving the same in a solvent.

7. That improvement in the art of producing varnishes which comprises the solution of rosin in a solvent substantially unaffected by nitric acid, subjecting such solution to the action of nitric acid, removing the excess acid from the product by washing, drying the product, and dissolving the same in a solvent.

8. That improvement in the art of producing varnishes which comprises the solution of a resinous gum in a petroleum product such as naphtha, subjecting the solution to nitric acid.

9. That improvement in the art of producing varnishes which comprises the solution of rosin in a petroleum product, such as naphtha, and subjecting the solution to nitric acid.

10. That improvement in the art of producing varnishes which comprises the solution of a resinous gum in a petroleum product such as naphtha, subjecting the solution to nitric acid, washing out the excess acid from the resulting solid, drying such solid, and dissolving the same in a suitable solvent.

11. That improvement in the art of producing varnishes which comprises the solution of rosin in a petroleum product such as naphtha, subjecting the solution to nitric acid, washing out the excess acid from the resulting solid, drying such solid, and dissolving the same in a suitable solvent.

In witness whereof, I have hereunto set my hand and seal at St. Louis, Missouri, this 25th day of July, A. D. one thousand nine hundred and eight.

JOHN JACOB KESSLER. [L. S.]

Witnesses:
ADELE GARRELS,
JACOB KESSLER.